United States Patent [19]

Ishiguro et al.

[11] 4,441,971
[45] Apr. 10, 1984

[54] PROCESS AND APPARATUS FOR REDUCING SOOT

[75] Inventors: Tomoji Ishiguro; Yoshimi Kizaki, both of Nagoya, Japan

[73] Assignee: Kabushiki Kaisha Toyota Chuo Kenkyusho, Japan

[21] Appl. No.: 452,868

[22] Filed: Dec. 23, 1982

Related U.S. Application Data

[63] Continuation of Ser. No. 185,571, Sep. 9, 1980, abandoned.

[30] Foreign Application Priority Data

Sep. 20, 1979 [JP] Japan .................................. 54-121331
Mar. 6, 1980 [JP] Japan .................................. 55-28952

[51] Int. Cl.³ .......................... F01N 3/00; B01J 1/00; B01J 8/00
[52] U.S. Cl. ..................................... 204/164; 60/273; 60/274; 60/275; 422/186; 423/212

[58] Field of Search .................. 422/186; 60/273, 274, 60/275; 204/164

[56] References Cited

U.S. PATENT DOCUMENTS

3,846,637 11/1974 Gettinger .......................... 422/186
3,979,193 9/1976 Sikich ................................ 55/123
4,077,888 3/1978 Rhoades et al. ............... 422/186.23

Primary Examiner—F. Edmundson
Attorney, Agent, or Firm—Berman, Aisenberg & Platt

[57] ABSTRACT

The process and apparatus for reducing soot in soot-containing gases, such as exhaust gases from a Diesel engine, by applying thereto an alternating or pulsating voltage to promote oxidation of soot and to change the character of soot. The resultant gas may be contacted with active medium, such as a heated net of metal or an oxidation catalyst, to oxidize the remaining soot.

3 Claims, 5 Drawing Figures

F I G. 1
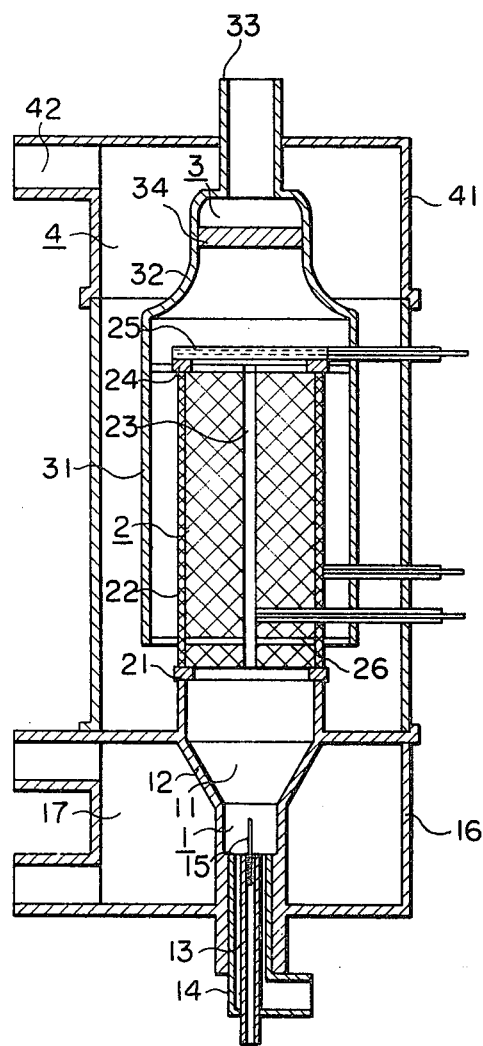

F I G. 2
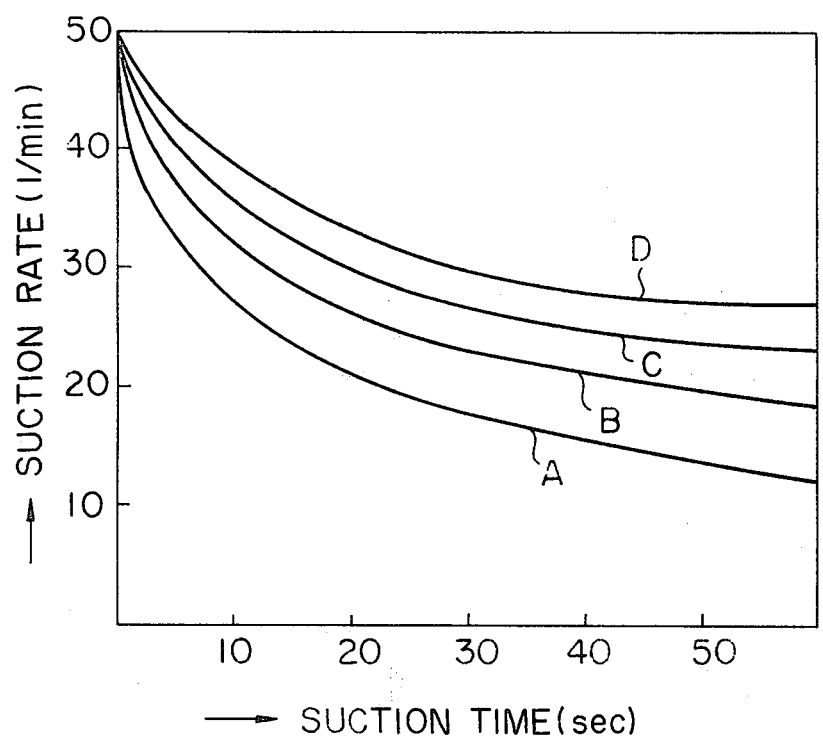

PROCESS AND APPARATUS FOR REDUCING SOOT

CROSS-REFERENCE TO RELATED APPLICATION

The present application is a continuation of application Ser. No. 185,571, filed Sept. 9, 1980, now abandoned.

BACKGROUND OF THE INVENTION

1. Field of the Invention

This invention relates to a process and an apparatus for reducing the amount of soot which may be contained in exhaust gases from a combustion chamber of an internal combustion engine, or the like.

2. Description of the Prior Art

The greater part of soot forming black smoke rising from the flame of hydrocarbons is generally composed of fine particles having a diameter which is not larger than 2 microns. When these particles are collected only by known centrifugal separators, for example, the apparatus causes an extremely high resistance to exhaust gases and has to be enlarged. Therefore, it is virtually impossible to use such an apparatus for purifying soot issuing from the combustion chamber of an internal combustion engine for an automobile or the like. If a filter device is used for collecting soot, a number of problems which may result therefrom include the possibility of the filter being choked with the soot, leading to an increased back pressure.

SUMMARY OF THE INVENTION

Accordingly, one object of the present invention is to provide a process and an apparatus for effectively reducing soot in soot-containing gases.

Another object of the present invention is to provide a process and a compact apparatus for purifying exhaust gases from an internal combustion engine, such as a Diesel engine, by oxidation of the soot contained therein.

Still another object of the inventioon is to provide a process and an apparatus with a prominent soot reducing effect, particularly on exhaust gases at high temperatures.

Further objects are apparent from the description which follows.

According to this invention, soot-containing gases are introduced into an electric field in which an alternating or pulsating voltage prevails; fine particles of soot connected in chains are thus broken into individual, finer particles, thereby promoting reduction of soot and changing the character of the soot.

It is known that particles of the soot produced in a combustion chamber usually have an increased diameter, and connect themselves in chain form into masses each having a diameter of at least about 0.2 micron as they pass through a flue, or the like. The process according to the present invention involves application of an alternating or pulsating voltage for converting masses of soot paricles, each having a diameter of at least 0.2 micron, into individual, finer particles having a diameter not greater than several hundred angstroms, thereby increasing the surface area of the soot and forming it into an aerosol or substantially gasifying it. Thus, oxidation or reduction of soot and change in the character of soot are effected.

The alternating or pulsating voltage is in the range of 100 v/cm to 10,000 v/cm, and the frequency is in the range of 10 Hz to 250 Hz. The masses of soot, which are charged with electricity from the beginning, are divided into individual and finer particles when an alternating or pulsating voltage is applied thereto. When a pulsating voltage is applied, less soot clings to an electrode or a flue wall, as compared with application of an alternating voltage.

The aforementioned procedure as the first step of the invention may be followed by the second step in which a gas containing finely-divided soot and formed into an aerosol state by the first step is contacted with an active medium, thereby positively reacting the soot with oxygen in the gas, i.e. burning the soot, and removing the remaining soot from the gas. The active medium may be a heated net of metal, and/or an oxidation catalyst formed in the shape of a honeycomb or the like. If a heated net of metal is used, the heat which it contains promotes the reaction between the soot and the oxygen in the gas. If an oxidation catalyst is employed, its catalytic action promotes the reaction between the soot and the oxygen. During this step of the process, the soot is oxidized in the heat and/or the catalytic action, and its surface is gradually lost by oxidation until ideally the entire soot finally disappears. Thus, the second step serves to promote oxidation of the soot.

When gases to be purified are exhaust gases from an internal combustion engine, such as an automobile Diesel engine, mere application of an alternating or pulsating voltage by the first step of the invention will sufficiently reduce the amount of soot, resulting in purification of exhaust gases. The second step, if applied, will further promote oxidation of the soot.

Internal combustion engines to which the present invention is applicable include both a gasoline engine and a Diesel engine. Particularly in a Diesel engine where exhaust gases include much soot, the soot is effectively reduced according to the present invention. The soot reducing effect will be the more prominent with exhaust gases at the higher temperatures.

BRIEF DESCRIPTION OF THE DRAWINGS

FIG. 1 is a longitudinal sectional view of the apparatus in which the soot reducing apparatus according to the first embodiment of the invention is included;

FIG. 2 is a graph showing the relation between the time and flow rate of gas suction through the filter shown in FIG. 1;

DESCRIPTION OF THE PREFERRED EMBODIMENTS

Figure 3:
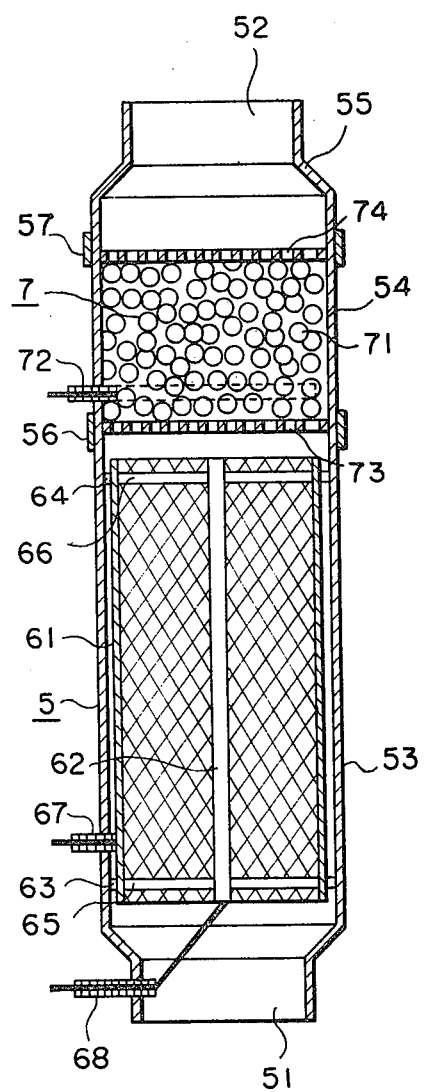
FIG. 3 is a longitudinal sectional view of the soot reducing apparatus according to the second and fourth embodiments of the invention.

The present invention will now be described in connection with the embodiments thereof.

FIG. 1 shows in longitudinal section the essential parts of the apparatus in which the soot reducing apparatus according to the first embodiment of the present invention is included.

This apparatus comprises a soot generating portion 1, a soot reducing portion 2 provided above the soot generating portion 1, a first exhaust portion 3 covering the soot reducing portion 2, and a second exhaust portion 4 provided outside the first exhaust portion 3. The soot generating portion 1 includes a combustion chamber 11 defined by a funnel-shaped wall 12 having an opening diameter of 50 mm and a depth of 50 mm, a fuel pipe 13 of the configuation corresponding to the funnel leg, provided in the bottom center of the combustion chamber wall 12 and having an inside diameter of 2.5 mm, an air pipe 14 defining a double pipe with the fuel pipe 13 and having an inside diameter of 6 mm, a wick 15 formed by a bundle of glass elements inserted in one end of the fuel pipe 13, and an outer wall 16 surrounding the combustion chamber wall 12 and defining a water chamber 17 therewith. The outer wall 16 is provided at its bottom and top with an inlet for the cooling water to be supplied into the water chamber 17, and an outlet therefor, respectively.

The soot reducing portion 2 is situated above the combustion chamber 11 in the soot generating portion 1, and connected with the opening of the combustion chamber wall 12 by a ceramic ring 21. The soot reducing portion 2 comprises a first electrode 22 formed by a cylindrical net of metal having a diameter of 50 mm substantially equal to that of the opening in the combustion chamber wall 12, and a length of 100 mm, a second electrode 23 formed by a stainless steel rod secured by a ceramic insulator 26 to the first electrode 22 along the longitudinal axis thereof, and having an outside diameter of 2 mm and a length of 100 mm, and a netlike active medium 25 secured by a ceramic ring 24 to the other end of the first electrode 22. The active medium 25 is formed in such a manner that a Kanthal alloy wire (which includes 20 to 30% of Cr, 2.5% of Co, 1.5 to 5% of Al and the balance of Fe, and which generates heat when supplied with electricity) is enclosed in a thin tubular insulator and secured to extend over the whole surface of a net of stainless steel on one of the upper and lower sides thereof, and a layer of water glass is coated on the surfaces of the stainless steel net and insulator, and a fine powder of vanadium oxide and zirconia is applied to the layer of water glass. Accordingly, the active medium 25 serves both as a heating element and as a catalyst for oxidation.

The first exhaust portion 3 comprises a first exhaust pipe 31 surrounding the first electrode 22, having an open bottom and having an inside diameter of 80 mm, a bell-shaped collecting pipe 32 connected to the upper end of the first exhaust pipe 31, and a second exhaust pipe 33 connected to the upper end of the collecting pipe 32 and leading to an exhaust pump not shown. The collecting pipe 32 is provided in the center thereof with a soot trapping filter 34 of highly heat resistant and high purity glass fibers coated with Teflon (tetrafluoroethylene resin), and having a mesh of about 0.8 micron and an outside diameter of 47 mm.

The second exhaust portion 4 comprises a closed cylindrical outer wall 41 disposed outwardly of the first exhaust portion 3, and having a lower end joined to the upper end of the combustion chamber wall 16, and an opening 42 formed on one side of the outer wall 41 adjacent to the upper end thereof. The second exhaust portion 4 is provided for taking the place of the first exhaust portion 3 in the event the latter has ceased to exhaust gases properly when the filter 34 in the first exhaust pipe 3 is choked with soot. More specifically, if the filter 34 is choked with soot, exhaust gas flows downwardly through the space between the first exhaust pipe 31 in the first exhaust portion and the first electrode 22, and through the lower end of the first exhaust pipe 31, and flows upwardly through the space between the first exhaust pipe 31 and the outer wall 41 of the second exhaust portion 4 until it is finally discharged through the opening 42 into the open air. If the resistance created by the filter against the flow of gas is so low that a greater quantity of gas than is supplied from the combustion chamber 11 is forced to flow out through the second exhaust pipe 33, additional air is supplied through the second exhaust portion 4 along a path extending in an opposite direction to that along which the gas is exhausted as hereinabove described. Therefore, the apparatus can maintain a uniform rate of combustion in its combustion chamber 11, irrespective of the presence of the aforementioned forced discharge through the first exhaust portion 3, and the variation in the resistance created by the filter 34 against air flow.

For testing, light fuel oil was supplied into the apparatus through the fuel pipe 13 at a rate of 0.13 ml per minute, while air was introduced through the air pipe 14 at a rate of 1,500 ml per minute, and the wick 15 made of glass fiber was ignited with an air-fuel ratio of 19.5, whereby soot was generated at a constant rate. Then, the soot reducing portion 2 was operated under four typical conditions as shown in the following table, and the quantity of the soot under each of those conditions was collected on the filter 34 in the first exhaust portion 3. The quantity of the soot collected on the filter 34 was obtained by detecting the quantity of the gas passing through the filter 34 per unit time.

TABLE

| | soot reducing portion | | |
|---|---|---|---|
| condition | voltage between electrodes | heating of active medium | symbols in FIG. 2 |
| 1 | 0 | not heated | A |
| 2 | 0 | heated to 500° C. | B |
| 3 | DC, 2,400 v/cm | heated to 500° C. | C |
| 4 | alternating, 60 Hz, 2,400 v/cm | heated to 500° C. | D |

The mode of soot collection by the filter 34 under each condition is shown by way of a graph in FIG. 2 representing the relation between the time and flow rate of gas suction. The relation between the operating conditions and the symbols assigned to the curves in the graph is shown in the table above.

It is noted from the table and FIG. 2 that if no voltage was applied between the electrodes, and the active medium was not heated, the flow rate of the gas decreased sharply with the lapse of the suction time, and dropped from 50 liters per minute to 12 liters per minute in 60 seconds after the suction had been started, as shown by curve A. This reduction in the flow rate was due to the soot collected on the filter 34 and blocking its pores.

When no voltage was applied between the electrodes, but the active medium was heated to 500° C., the reduction in the flow rate of the gas after 60 seconds was improved from 12 liters per minute to 19 liters per minute, as compared with the case in which the active medium was not heated, as shown by curve B. This improvement is considered to have been due to the oxidation of the soot by the action of the active medium with a resultant reduction in the soot collected on the filter 34.

When the active medium was heated to 500° C., and a DC voltage of 2,400 v was applied between the electrodes being 1 cm apart, the flow rate of the gas after the 60 seconds was increased to 23 liters per minute, as shown by curve C. This increase was attributable to the application of the DC voltage between the electrodes, but soot was found on the electrode 23 which was a cathode. Accordingly, it is not clear whether the application of a DC voltage contributes to breaking soot finely, and promotes its oxidation by the active medium.

Attention is finally directed to one of the optimum conditions for this invention in which the active medium was heated to 500° C., and alternating voltage of 2,400 v with a frequency of 60 Hz was applied between the electrodes being 1 cm apart. Under this condition, the flow rate of the gas after the lapse of 60 seconds increased to 27 liters per minute, as shown by curve D. In this case, no deposition of soot was found on either of the electrodes. The difference in the flow rate between curves B and D is believed to have been due to the effect of the alternating voltage which divided the soot finely and formed it into an aerosol, whereby the oxidation of the soot by the active medium was promoted, and a reduced amount of soot was collected on the filter 34.

Reference is now made to FIG. 3 showing a soot reducing apparatus according to the second embodiment of the invention. This apparatus comprises a container 5 having an inlet 51 for a gas containing soot and an outlet 52 therefor, a pair of electrodes 61 and 62 provided within the container 5 on the inlet 51 side, a voltage generator which is not shown, for supplying an alternating or pulsating voltage to the electrodes 61 and 62, and an active medium 7 provided within the container 5 on the outlet 52 side for oxidizing soot. The container 5, which is made of steel, has the shape of a pipe having a diameter of about 8 cm and a length of about 30 cm, and comprises a front protion 53, a central portion 54, and a rear portion 55. The front portion 53 has the inlet 51 at one end thereof, and encloses the pair of electrodes 61 and 62 therein. The central portion 54 is a section in which the active medium 7 is accommodated. The outlet 52 is provided in the rear portion 55. The front and central portions 53 and 54 of the container 5, and the central and rear portions 54 and 55 are connected with each other by annular metal fasteners 56 and 57, respectively. The electrode 61 is formed by a tubular net of metal having a diameter slightly smaller than the inside diameter of the front portion 53 of the container 5, and accommodated in the front portion 53 coaxially therewith, and the electrode 62 is formed by a rod of metal disposed along the longitudinal axis of the front portion 53. The tubular electrode 61 is secured at both ends thereof to the inner wall of the front portion 53 of the container 5 by ceramic insulators 63 and 64, while the rod-shaped electrode 62 is secured against the inner wall of the tubular electrode 61 by radially extending ceramic insulators 65 and 66. The electrodes 61 and 62 are provided with cables 67 and 68, respectively, which are enclosed in tubular ceramic insulators, and extend outwardly of the front portion 53 for connection to the output terminals on the voltage generator not shown. The voltage generator may be selected from among conventionally known units. In this embodiment, it comprises a combination of a neon transformer, an auto-transformer and a full-wave rectification circuit.

The active medium 7 comprises beads of a catalyst 71, and a spiral electric heater 72 defining a source of heat, and is accommodated in a chamber defined by closing the opposite ends of the central portion 54 of the container 5 with metal screens. The catalyst 71 comprises vanadium oxide supported on granular zirconium oxide.

A gas containing soot, which was obtained from the soot generating portion 1 shown in FIG. 1, was introduced into the apparatus through its inlet 51, an alternating voltage of 2,400 v with a frequency of 60 Hz was applied between the electrodes 61 and 62 being 1 cm apart, and the electric heater 72 for the active medium 7 was heated to 500° C., whereby the soot was treated. The outlet 52 of the apparatus discharged a virtually colorless gas.

This invention may particularly be applied to a Diesel engine as follows.

Figure 4:
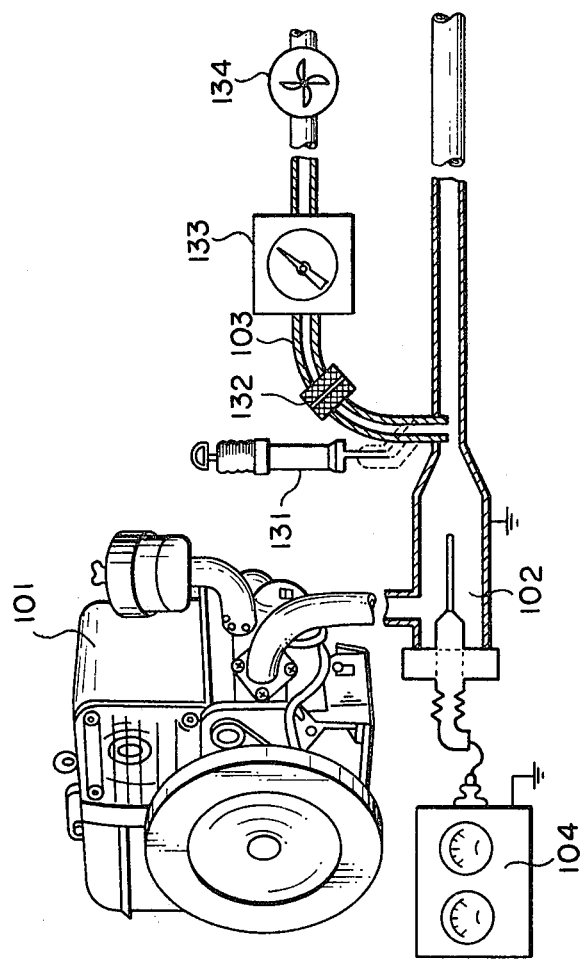
FIG. 4 is a schematic view of the apparatus for purifying exhaust gases from a Diesel engine in which the soot reducing apparatus according to the third embodiment of the present invention is included.

FIG. 4 shows a schematic view of the apparatus for purifying exhaust gases from a Diesel engine in which the soot reducing apparatus according to the third embodiment of the invention is included. This apparatus comprises a Diesel engine 101 for agricultural use having a stroke volume of 269 ml, a soot reducing apparatus 102 disposed at a distance of 300 mm from an exhaust port of the Diesel engine 101, and a collecting pipe 103 for collecting and analyzing the exhaust gas treated by the soot reducing apparatus 102. The collecting pipe 103 includes a collecting device 131 for smoke measurement, a sampling filter 132, a total flow rate meter 133 and a suction pump 134. Attached to the soot reducing apparatus 102 is a high voltage generating apparatus 104.

Figure 5:
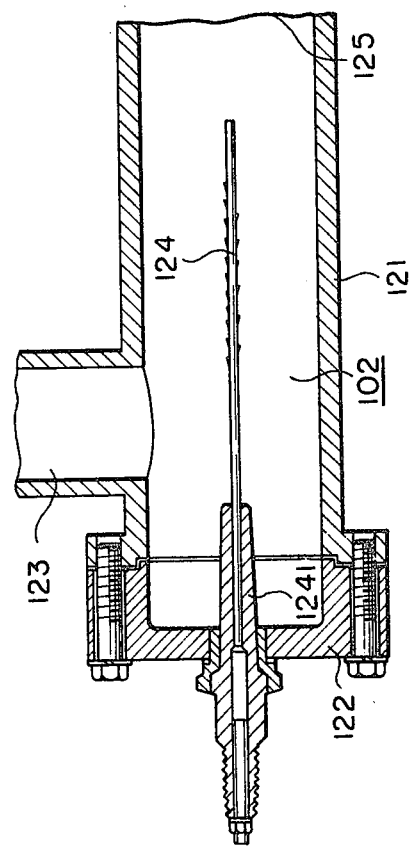
FIG. 5 is a cross-sectional view of the soot reducing apparatus shown in FIG. 4.

The soot reducing apparatus 102, the cross-sectional view of which is shown in FIG. 5, comprises an outer cylinder 121, a blind flange 122 secured to one open end of the outer cylinder 121 by bolts to close the open end, an exhaust gas inlet 123 provided perpendicularly to the axis of the outer cylinder 121 and opened adjacent to the flange 122, a rod-shaped center electrode 124 fitted in a center bore of the flange 122 through an insulator 1241, and an exhaust gas outlet 125 opened adjacent to the other end of the outer cylinder 121. In this apparatus, the outer cylinder 121 seves as an electrode and an alternating or pulsating voltage is applied between the center electrode 124 and the outer cylinder 121. In order to prevent the center electrode 124 from being contaminated due to the soot, air is blown from outside at a rate of 50 liters per minute around the periphery of the insulator 1241 within the outer cylinder 121.

With this construction, the Diesel engine 101 was run at a speed of 2,000 rpm and the exhaust gas therefrom was introduced into the soot reducing apparatus 102 at a rate of 269 liters per minute. Thus, the total amount of gas flowing through the cylinder 121, including 50 liters per minute of air for preventing contamination of the electrode, was 319 liters per minute. The temperature of the exhaust gas was 185° C.

Under these conditions, the exhaust gases were analyzed with respect to two cases where an alternating voltage of 20 Kv with a frequency of 250 Hz was applied between the electrodes (the distance therebetween being 3 cm) and where no voltage was applied. The outer cylinder 121 serving as an electrode was grounded. In the case where no voltage was applied between the electrodes, the exhaust gas showed a mean Bosch concentration of 1.15 and contained 4.54 mg of soot or granular substance in total, among 12 liters of exhaust gas, including 1.42 mg of unburnt carbon and 3.12 mg of oil. When the alternating voltage was applied, the exhaust gas showed a mean Bosch concentration of 0.55 and contained 2.76 mg of soot in total, including 1.24 mg of unburnt carbon and 1.52 mg of oil. This means that the application of the alternating voltage could reduce the Bosch concentration showing the smoke concentration by about 50% and the total amount of soot by about 39%. These results show that the process and apparatus according to the present invention have effects to reduce soot and to change the character of soot. Here, the Bosch concentration means a reflection type concentration showing the smoke or soot concentration in exhaust gases which is measured in accordance with the test method D1101 of the Japanese Industrial Standard. This test method is also referred to in "Exhaust gas and smoke in a Diesel engine" by Kinji Tsujimura, Internal Combustion Engine, volume 113, pages 95 to 104.

According to the fourth embodiment of the invention, the soot reducing apparatus as shown in FIG. 3 may be employed to further purify exhaust gases from a Diesel engine. In this embodiment, exhaust gases from a Diesel engine are introduced into the apparatus through the inlet 51, an alternating voltage of 20 Kv with a frequency of 250 Hz is applied between the electrodes (the distance therebetween being 3 cm), and the electric heater 72 for the active medium 7 is heated to 500° C., whereby the soot is treated and colorless gases are discharged through the outlet 52.

The casing or the container in the apparatus of this invention is not limited to the material and shape described above. For example, it is possible to utilize a portion of an existing stack or flue to form the container. The electrodes may be replaced by a pair of parallel metallic electrode plates, or other various forms of electrodes. The container itself can be used as one of the electrodes, if it is made of electrically conductive material. The active medium may also comprise various forms of an oxidation catalyst having a honeycomb or other structure.

The soot reducing apparatus of this invention is applicable to exhaust gases from a Diesel engine, smoke from an incinerator, and gases generated by various types of combustion chambers. The apparatus may have various shapes and dimensions appropriately selected to suit the quantities of the waste gas and soot produced per unit time, and the waste gas temperature.

Having now fully described the invention, it will be apparent to one of ordinary skill in the art that many changes and modifications can be made thereto without departing from the spirit or scope of the invention as set forth herein.

What is claimed is:

1. A process for reducing soot in exhaust gases from an automobile Diesel engine which comprises:
    introducing soot-containing exhaust gases from an automobile Diesel engine into a container;
    applying to said soot-containing exhaust gases an alternating or pulsating voltage in the range of from 100 v/cm to 10,000 v/cm and having a frequency in the range of from 10 Hz to 250 Hz to break masses of soot particles, each mass having a diameter of at least 0.2 micron, into individual finer particles, each having a diameter not greater than several hundred angstroms; and
    discharging said gases out of said container.

2. A process according to claim 1, which further comprises contacting said gases with an active medium, thereby oxidizing the soot.

3. A process according to claim 2, wherein
    said active medium is at least one of a heated article and an oxidation catalyst.

* * * * *